US008558730B2

(12) United States Patent
Hassen

(10) Patent No.: US 8,558,730 B2
(45) Date of Patent: Oct. 15, 2013

(54) METHOD AND DEVICE FOR DETECTING PRECIPITATION BY RADAR

(75) Inventor: Alebel Arage Hassen, Kokomo, IN (US)

(73) Assignee: Robert Bosch GmbH, Stuttgart (DE)

( * ) Notice: Subject to any disclaimer, the term of this patent is extended or adjusted under 35 U.S.C. 154(b) by 630 days.

(21) Appl. No.: 12/093,472

(22) PCT Filed: Sep. 17, 2007

(86) PCT No.: PCT/EP2007/059761
§ 371 (c)(1),
(2), (4) Date: Aug. 24, 2010

(87) PCT Pub. No.: WO2008/058786
PCT Pub. Date: May 22, 2008

(65) Prior Publication Data
US 2010/0309041 A1    Dec. 9, 2010

(30) Foreign Application Priority Data
Nov. 17, 2006   (DE) .................... 10 2006 054 320

(51) Int. Cl.
*G01S 13/95* (2006.01)
*G01S 13/34* (2006.01)
*G01S 13/00* (2006.01)

(52) U.S. Cl.
USPC ............. 342/26 R; 342/27; 342/59; 342/89; 342/90; 342/91; 342/118; 342/128; 342/145; 342/175; 342/192; 342/195

(58) Field of Classification Search
USPC ........ 342/26 R–26 D, 27, 28, 59, 89, 90, 175, 342/188, 192–197, 118, 128–133, 70–72, 342/91, 145; 343/700 R, 757
See application file for complete search history.

(56) References Cited

U.S. PATENT DOCUMENTS

| 3,646,555 | A | * | 2/1972 | Atlas ........................... 342/26 R |
| 3,715,748 | A | * | 2/1973 | Hicks .......................... 342/26 D |
| 3,881,154 | A | * | 4/1975 | Lewis et al. ................. 342/26 R |
| 4,286,462 | A | * | 9/1981 | Bourne ....................... 342/26 D |
| 4,649,388 | A | * | 3/1987 | Atlas ........................... 342/26 D |
| RE33,152  | E | * | 1/1990 | Atlas ........................... 342/26 R |
| 5,028,929 | A |   | 7/1991 | Sand et al. |
| 5,311,183 | A | * | 5/1994 | Mathews et al. ............ 342/26 B |

(Continued)

FOREIGN PATENT DOCUMENTS

| EP | 1229348  | 8/2002 |
| JP | 07248380 | 9/1995 |

OTHER PUBLICATIONS

International Search Report, PCT International Patent Application No. PCT/EP2007/059761, dated Dec. 21, 2007.

(Continued)

*Primary Examiner* — Bernarr Gregory
(74) *Attorney, Agent, or Firm* — Kenyon & Kenyon LLP

(57) ABSTRACT

A method for detecting precipitation in a region monitored by radar beams includes ascertaining a first average power of a first backscattered radar signal, ascertaining a second average power of a second backscattered radar signal, and detecting an existence of a homogenous medium when the average powers conform.

13 Claims, 3 Drawing Sheets

(56) References Cited

U.S. PATENT DOCUMENTS

| | | | | |
|---|---|---|---|---|
| 5,410,314 | A | * | 4/1995 | Frush et al. ............... 342/26 D |
| 5,500,646 | A | | 3/1996 | Zrnic |
| 5,534,868 | A | * | 7/1996 | Gjessing et al. ............ 342/26 D |
| 5,583,972 | A | * | 12/1996 | Miller ............................ 342/59 |
| 5,623,267 | A | * | 4/1997 | Wurman ..................... 342/26 D |
| 6,377,204 | B1 | * | 4/2002 | Wurman et al. ................ 342/59 |
| 6,462,699 | B2 | * | 10/2002 | Wurman et al. ................ 342/59 |
| 7,242,343 | B1 | * | 7/2007 | Woodell ...................... 342/26 B |
| 7,336,222 | B2 | * | 2/2008 | Praskovsky et al. .......... 342/195 |
| 7,365,674 | B2 | * | 4/2008 | Tillotson et al. ............ 342/26 B |
| 7,365,696 | B1 | * | 4/2008 | Smeltzer ...................... 343/757 |
| 7,417,577 | B2 | * | 8/2008 | Testud et al. ............... 342/26 R |
| 7,417,578 | B1 | * | 8/2008 | Woodell et al. ............. 342/26 R |
| 7,427,943 | B1 | * | 9/2008 | Kronfeld et al. ............ 342/26 B |
| 7,518,544 | B2 | * | 4/2009 | Venkatachalam et al. ...... 342/59 |

OTHER PUBLICATIONS

Senbokuya et al.: Development of the Spaceborne Dual Frequency Precipitation Radar for the Global Precipitation Measurement Mission; Geoscience and Remote Sensing Symposium, 2004. IGARSS '04. Proceedings. 2004 IEEE International, Anchorage, AK, USA Sep. 20-24, 2004, Piscataway, NJ, USA, IEEE, Bd. 5, Sep. 20, 2004, pp. 3566-3569, YXP010750760; ISBN: 0-7803-8742-2.

Takahashi et al: "The characteristics of system noise of TRMM/PR and their application to the rain detection algorithm"; Geoscience and Remote Sensing Symposium, 2004. IGARSS '04. Proceedings. 2004 IEEE International, Anchorage, AK, USA Sep. 20-24, 2004, Piscataway, NJ, USA, IEEE, Bd. 2, Sep. 20, 2004, pp. 910-913, XP010751039; ISBN: 0-7803-8742-2.

* cited by examiner

METHOD AND DEVICE FOR DETECTING PRECIPITATION BY RADAR

FIELD OF THE INVENTION

The present invention relates to a method, a computer program, and a computer program product for detecting precipitation in a region monitored by radar beams.

BACKGROUND INFORMATION

Precipitation, such as rain, hail, fog, or snowfall, may be detected by radar. For example, in meteorology, the intensity of precipitation may be determined via radar, in that a directed antenna emits electromagnetic radiation in the form of a pulse in the microwave range. A radar system that emits radar beams having a wavelength of approximately 3 to 10 cm may be used for this purpose. If the radiation strikes a particle in the atmosphere whose diameter is larger than approximately 0.2 mm, the radiation is reflected by it. The wavelength of the radiation does not change in the process. Part of this radiation is detected by a radar receiver and the reflectivity is measured. If certain assumptions are made about the particle and drop size distribution of the precipitation respectively, it is possible to calculate the intensity of the precipitation from the reflectivity. Then a conversion takes place using a so-called Z-R relationship, Z standing for reflectivity and R for the intensity of the precipitation.

International Patent Application No. WO 1993002370 A1 describes a method for detecting rain. In this instance, multiple radar signals are emitted. Backscattered signals are received in order to generate a Doppler spectrum. A reduced amplitude in the Doppler spectrum, in particular in the regions near the edges of the spectrum, indicates rain.

European Patent No. EP 1229348 describes a system for detecting rain or hail using a weather radar. For that purpose, different standard deviation and reradiation intensity cards are combined with one another.

Japanese Patent No. 07248380 describes a device for correcting a calculated rain intensity in conjunction with a radar.

Japanese Patent No. JP 10048333 A describes a radar device that detects snowfall or rain by receiving a reflected signal and measuring its level.

SUMMARY

Against this background, the present invention provides a method device, computer program, and computer program product for detecting precipitation in a region monitored by radar beams.

In an example method according to the present invention for detecting precipitation in a region monitored by radar beams, a first average power of a first backscattered radar signal and a second average power of a second backscattered radar signal are ascertained. According to the present invention, an existence of precipitation is determined by comparing the average powers to one another.

In one preferred specific embodiment, the correlation of the respectively ascertained average powers is used to ascertain that the average powers conform.

In one advantageous refinement of the method according to the present invention, another average power of an additional backscattered radar signal is determined.

Evaluating more than two backscattered radar signals increases the accuracy of the detection of precipitation. The backscattered radar signals may be reflections of radar signals that are emitted by adjacent radar transmitters.

In one preferred specific embodiment, at least one weighting factor may be taken into account in determining the conformity of the average powers, the at least one weighting factor being designed to compensate for different radar antenna characteristics. Using weighting factors makes it possible to compare the average powers even when the radar signals on which they are based derive from radar transmitters having different designs. This increases the flexibility of the method according to the present invention.

According to one preferred specific embodiment, the average powers are ascertained for a particular object-free section of the monitored region.

According to one specific embodiment, to ascertain the average powers, a spectral power density is detected for each backscattered radar signal respectively and integrated across the object-free section.

According to one preferred design of the method according to the present invention, the object-free section is able to be determined by analyzing the spectral power densities of the backscattered radar signals. In the process, the object-free section corresponds to a shared subsection of the spectral power densities, in which none of the spectral power densities has a peak that projects beyond a background noise of the respective spectral power density.

According to an additional preferred specific embodiment, it is possible to determine a density of the precipitation or a radar signal damping. This may be done by evaluating an increase in the background noise of at least one of the spectral power densities.

The precipitation may be rain, snowfall, fog, or hail, for example. The precipitation's main direction of movement may be orthogonal to the radar beams. Advantageously, according to the approach according to the present invention, the precipitation may be detected without evaluating a Doppler effect.

According to one preferred specific embodiment, a long-range radar FMCW radar transmitter is used to generate partially overlapping or adjacent radar radiation cones. In this context, the backscattered radar signals may be respectively assigned to one radiation cone. FMCW radar (frequency-modulated continuous wave), also known as modulated continuous wave radar, is a radar signal having a frequency that constantly changes. The frequency either rises in a linear fashion to then drop abruptly back to the initial value (sawtooth model) at a specific frequency, or it may rise and fall alternately at a constant rate of change. Using such a linear modification of the frequency and a simultaneous constant transmission, it is possible to ascertain not only the differential speed between sender and object, but simultaneously also the absolute distance from each other.

An example device according to the present invention implements all steps of the method according to the present invention.

An example computer program having program-code according to the present invention is designed to implement all steps of the method according to the present invention when this computer program is implemented on a computer or a corresponding computing unit, in particular a device according to the present invention.

The computer program product according to the present invention having program code that are stored on a computer-readable storage medium is provided for implementing the example method according to the present invention when this computer program is implemented on a computer or a corresponding processing unit, in particular on a device according to the present invention.

The present invention is based on the knowledge that, depending on operating frequency, radar sensors are degraded differently by the appearance of precipitation in the signal transmission medium. The precipitation may be rain or snowfall, for example. The degrading effect appears particularly at higher frequencies, as used for example in automotive radar sensors, and depending on the intensity of the precipitation, may produce different degrees of degradation in the radar signal. In the case of long-range radar or remote-area radar, more than two radiation cones or antenna beams are used for localizing objects in the traffic scenario. In road traffic, the receivers and sensors provided will receive the same intensity I only when the emitted radar signal is back-scattered by an object, such as rain, that fills a radar cell homogenously or uniformly. In this connection, the radar cell corresponds to the field of view of the radar.

The approach according to the present invention may be used for a multitude of applications. First and foremost, the present invention makes it possible to detect an appearance of precipitation in the radar signal transmission medium. Furthermore, it is possible to determine a precipitation intensity and to estimate a performance loss of the radar transmitter. The present invention may be used to change over or adjust the system, for example, a modulation system, to the current signal transmission medium in order to maintain a restricted functionality of the radar transmitter in bad weather conditions. That is, it is possible to vary the power of the transmitted signals as a function of an ascertained precipitation, for example. A further advantage of the approach according to the present invention is that the method according to the present invention may be used, in part without modification, on existing automotive radar transmitters that generate at least two radiation cones. Future radar transmitters and systems may be optimized such that they are able to utilize the advantages of the present invention. Furthermore, the approach according to the present invention is suitable as a signal source for safety-relevant systems in vehicles.

It is understood that the aforementioned features and the features explained below may be used not only in the combination indicated in each instance, but also in other combinations or by themselves, without departing from the scope of the present invention.

The present invention is represented schematically in the drawing in light of exemplary embodiments, and is described in detail below with reference to the figures.

DETAILED DESCRIPTION OF EXAMPLE EMBODIMENTS

Figure 1:
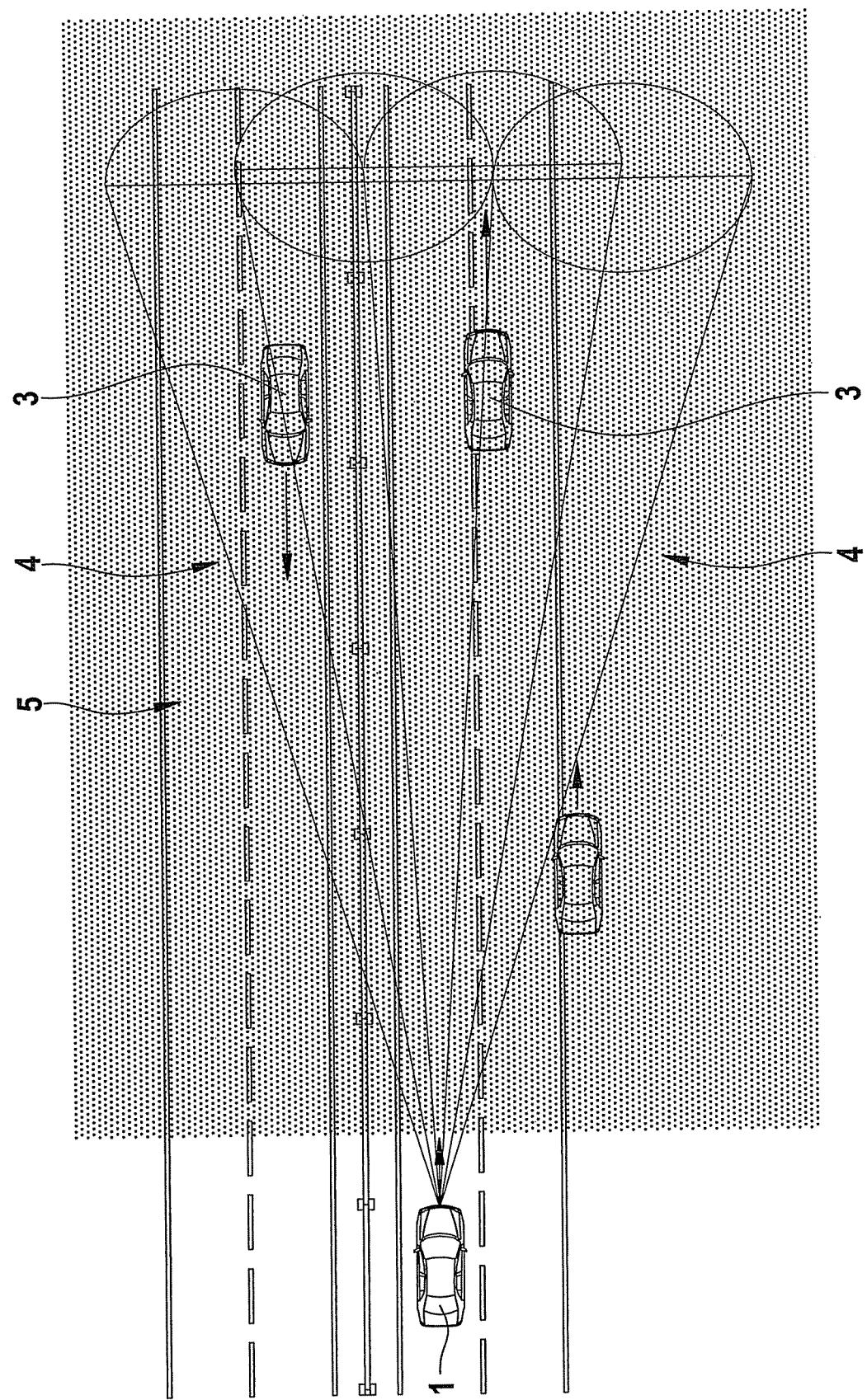
FIG. 1 shows a schematic representation of a use of a radar system in road traffic according to one specific embodiment of the present invention.

FIG. 1 shows a use of a multi-beam automotive radar system in road traffic. A vehicle 1, also known as radar vehicle, is equipped with a long-range radar system (LRR). The radar system includes at least one transmitter or antenna, at least one receiver or sensor, and processing means, such as a microprocessor for evaluating backscattered radiation received by the receiver. Transmitter and receiver are expediently designed as an antenna, which carries out transmitting and receiving functions.

Vehicle 1 moves on a street that may be defined by delimitations, for example, in the form of a guard rail. Additional vehicles 3, which may be monitored by the radar of vehicle 1, move on the street. The radar of vehicle 1 emits a plurality of radar cones or antenna beams 4 to monitor vehicles 3. A region monitored by antenna beams 4 is permeated by precipitation, in this case by rain 5.

The precipitation's main direction of movement is orthogonal to the radar beams. In the exemplary embodiment shown in FIG. 1, the radar beams are emitted in a horizontal direction. The rain falls in a vertical direction.

Figure 2:
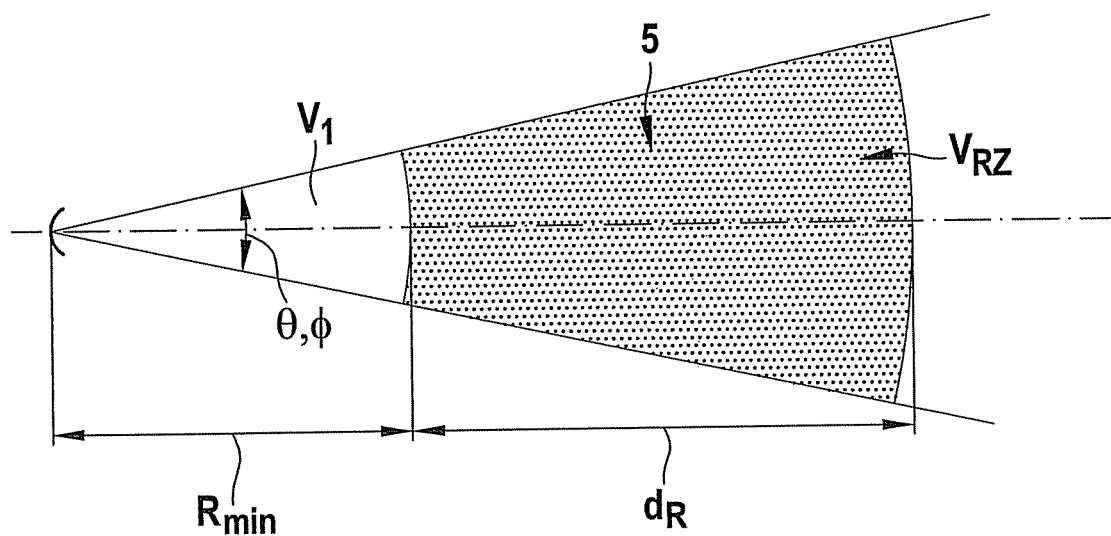
FIG. 2 shows a schematic representation of a homogenous medium in a region monitored by radar beams according to one specific embodiment of the present invention.

FIG. 2 shows a schematic representation of rain drops in a monostatic radar cell. The radar cell may be a region that is monitored by a radiation cone 4 shown in FIG. 1. The monostatic radar cell proceeds from a radar located at the pointed tip of the radar cone. The angles $\theta$ and $\Phi$ specify a horizontal or vertical antenna opening angle, respectively. It is possible to subdivide the radar cell into two sections. A first section $V_1$ proceeds from the radar and is delimited by the radius $R_{min}$. The second section $V_{RZ}$ abuts on the first section, has a length of $d_R$ and is thus delimited by radius $R_{min}+d_R$. The second section $V_{RZ}$ of the radar cell is permeated with rain 5 and thus constitutes a rain cell. Apart from the precipitation in the form of rain 5, there are no inhomogenous objects, such as vehicles 3, within the rain cell.

When the long-range radar measures, a radar wave is emitted by a transmitter located on vehicle 1, reflected off of the object, for example, a vehicle 3, and intercepted again by a receiver assigned to the transmitter. The echo times and Doppler shifts that occur in the process are used in radar sensors to determine the distance and relative speed of the object. In long-range radar, depending on the requirement for the radar view width, a plurality of radiation cones 4 are used to localize objects to be detected in the traffic scenario. In this context, for example, for an FMCW radar system, an object results in a peak in the spectrum, which is simultaneously detected by two adjacent radiation cones. The angle to the object is able to be established by analyzing the amplitude and phase relationship of these adjacent cones in what is generally known as the "monopulse method."

Figure 3:
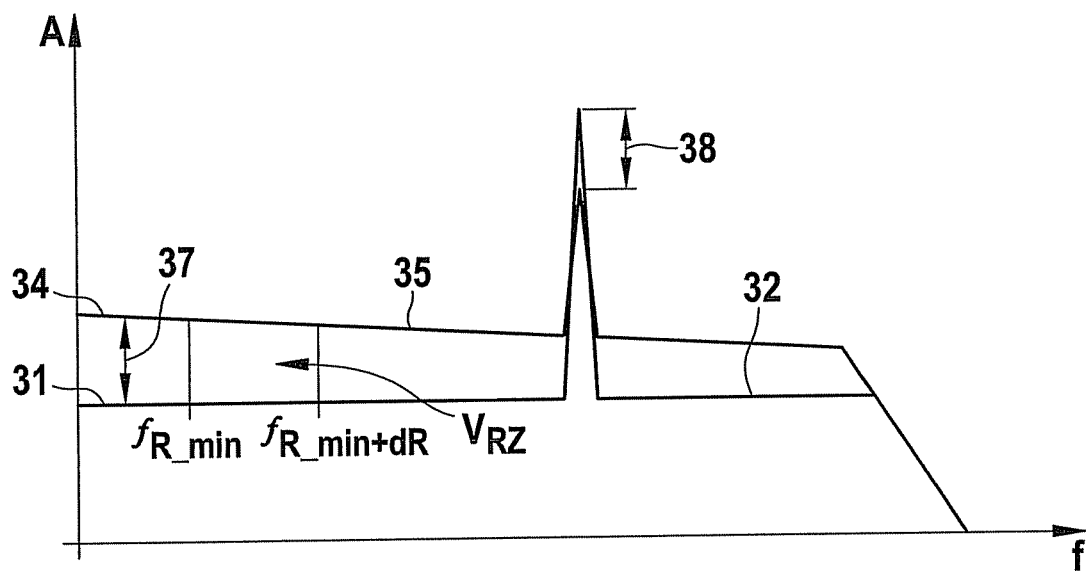
FIG. 3 shows a radar signal spectrum according to one specific embodiment of the present invention.

FIG. 3 shows a signal spectrum and uses the example of the FMCW radar. Frequency f is plotted on the horizontal axis, and amplitude spectrum A of a backscattered signal (echo) is plotted on the vertical axis.

A first spectrum 31 shows an instance of an application in which a radar signal is reflected by a solid object. For example, the object may be one of the vehicles 3 shown in FIG. 1. The radar signal is not damped by precipitation. First spectrum 31 thus has a low background noise 32 and a high peak. The peak, in the form of a peak form that clearly projects out of background noise 32, is produced by reflection of the radar signal off of the object.

A second spectrum 34 shows an instance of an application in which the radar signal is reflected again by the object. Furthermore, the radar signal is damped by precipitation. Second spectrum 34 thus has a high background noise 35. Background noise 35 lies distinctly above that of first spectrum 31. Further, second spectrum 34 has a lower peak than first spectrum 31. The increase in the background noise caused by precipitation is labeled by reference symbol 37, and a reduction in the object peak is labeled by reference symbol 38.

Signals that are reflected by a material, such as precipitation, that fills the radar cells homogenously or uniformly do not produce a peak in the spectrum of the FMCW radar. Instead, a signal power is distributed in the broad frequency range and significantly raises background noise 35 of second spectrum 34. This signal power is reflected back by all of the radiation cones 4 that are shown in FIG. 1, for example, and may be calculated from the measured spectral power density for an object-free section of the radar cell. This takes place, for example, according to the principle of multiple scattering of a first order of narrow radiation cones ("Narrow-Beam First Order Multiple Scattering").

The position of the object-free region $V_{RZ}$ of length $d_R$ shown in FIG. 2 is labeled as the spectral region in FIG. 3, which is located between frequencies $f_{R\_min}$ and $f_{R\_min}+d_R$. The region delimited by frequencies $f_{R\_min}$ and $f_{R\_min}+d_R$ thus indicates an average rain backscattering from rain cell 5. The average power backscattered by rain is calculated, according to the multiple scattering principle mentioned, by integrating the spectral power density measured by LRR in the section $f_{R\_min}$ to $f_{R\_min}+f_{dR}$ of the radar cell. From this, it is possible to determine the rain intensity, and thus the radar signal damping and the LRR performance loss, via the backscattering cross section of the rain.

Figure 4:
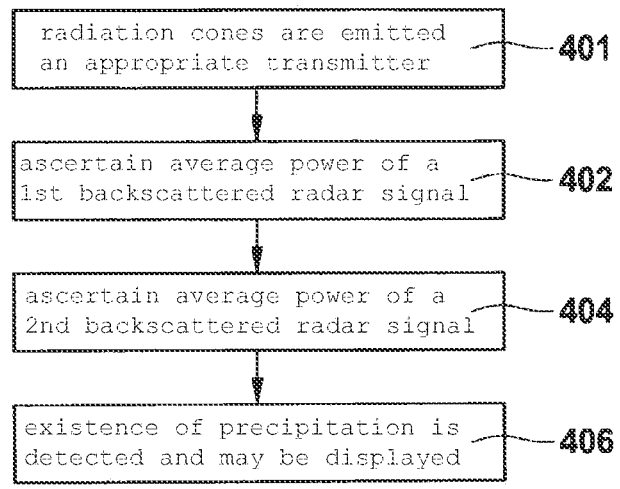
FIG. 4 shows a flow chart of a preferred specific embodiment of the method according to the present invention.

FIG. 4 shows a flow chart of a method for detecting precipitation in a region monitored by radar beams according to a preferred exemplary embodiment of the present invention. In a first step 401, at least two non-overlapping or only partially overlapping radiation cones are emitted by at least one appropriate transmitter (antenna). In a further step 402, a first average power of a first backscattered radar signal is ascertained. In a further step 404, a second average power of a second backscattered radar signal is ascertained. In a third step 406, an existence of precipitation is detected and if applicable displayed when the average powers of the two backscattered signals conform.

The region monitored by radiation cones or radar beams may be the region shown in FIG. 1, for example, which is covered by radiation cones 4. The precipitation may uniformly fill the region monitored by radar beams, with the exception of existing solid objects that constitute an inhomogeneity with regard to the monitored region, for example, in the form of vehicles 3 shown in FIG. 1. In contrast to the solid objects, which radar beams are not able to penetrate, radar beams are able to partially penetrate the precipitation.

As shown in FIG. 1, a plurality of radiation cones 4 may be used when implementing the method according to the present invention. Four radiation cones are used in the exemplary embodiment shown in FIG. 1. Accordingly, for the method according to the present invention it is possible to use additional backscattered radar signals to detect precipitation. In this case, the method according to the present invention may have one or multiple additional steps to ascertain one or multiple additional average powers. In this context, the additional average powers are ascertained from the additional backscattered radar signals. The backscattered radar signals may be generated by reflecting radar signals that are emitted by radar transmitters (antennas) disposed immediately adjacent to one another. In FIG. 1, radar signals are emitted by radar transmitters or antennas that are disposed immediately adjacent to one another on a front side of vehicle 1. It is likewise possible to cover the entire region covered by radiation cones 4 by a single antenna that is designed to be able to swivel accordingly between the transmission of individual radiation cones.

If all radiation cones 4 used to generate the backscattered radar signals have the same antenna characteristics, then the associated radar sensors or receivers will respectively detect the same backscattered average intensity I as follows:

$$I_{b1}=I_{b2}=I_{b3}=I_{b4}=\ldots=I_{bn}$$

In this context, $I_{bi}$ (i=1–n) stands for the average intensity of a backscattered radar signal of the $i^{th}$ radiation cone.

If the radiation cones have different antenna characteristics, the average powers may be adjusted to one another. At least one weighting factor may be taken into account while determining the conformity of average powers I, the at least one weighting factor being designed to compensate for different radar antenna characteristics.

According to this exemplary embodiment, the average intensity may be calculated in the following manner, taking into account different antenna characteristics:

$$\alpha_{b1}I_{b1}=\alpha_{b2}I_{b2}=\alpha_{b3}I_{b3}=\alpha_{b4}I_{b4}=\ldots=\alpha_{bn}I_{bn}$$

In this context, obi (i=1–n) represents the weighting factors and the power ratios between a radiation cone i and a radiation cone selected as a reference, for example, the radiation cone having the maximum power. This approach may be used with all radar types to automatically detect precipitation.

According to this exemplary embodiment, the average powers are respectively ascertained for one object-free section of the monitored region. For that, the steps of ascertaining may respectively include one step of detecting a spectral power density of the backscattered radar signal and one step of integrating the spectral power density, respectively via the object-free section. With regard to FIG. 3, this means that second characteristic curve 34 is integrated via section $f_{R\_min}$, $f_{R\_min+dR}$, for example.

It is possible to determine the object-free section by analyzing the spectral power densities of the backscattered radar signals. In this context, the object-free section corresponds to a shared subsection of the spectral power densities, in which none of the spectral power densities has a peak. Such a peak is characterized in that it rises clearly above a noise of the respective spectral power density and thus indicates a solid object that is inhomogenous with regard to its homogenous surroundings. Such a projecting peak is shown in FIG. 3.

According to the exemplary embodiment shown, a correlation of the average powers may be used to ascertain that the average powers conform. If the correlation result indicates that the average powers conform, then a homogenously distributed medium, such as precipitation, has been detected. This may be indicated by a signal, for example.

As shown in FIG. 3, precipitation results in an increase in background noise in the region monitored by radar beams. By analyzing the increase of at least one of the spectral power densities, it is possible to determine a density of the homogenously distributed medium, i.e., a rain intensity, for example, with the aid of a radar-signal damping. The increase may follow from a comparison of current background noise to a stored reference background noise. The radar signal damping indicates how strongly a radar signal is damped by the precipitation. Values that specify the density of the homogenously distributed medium and the radar signal damping may likewise be indicated by signals.

Figure 5:
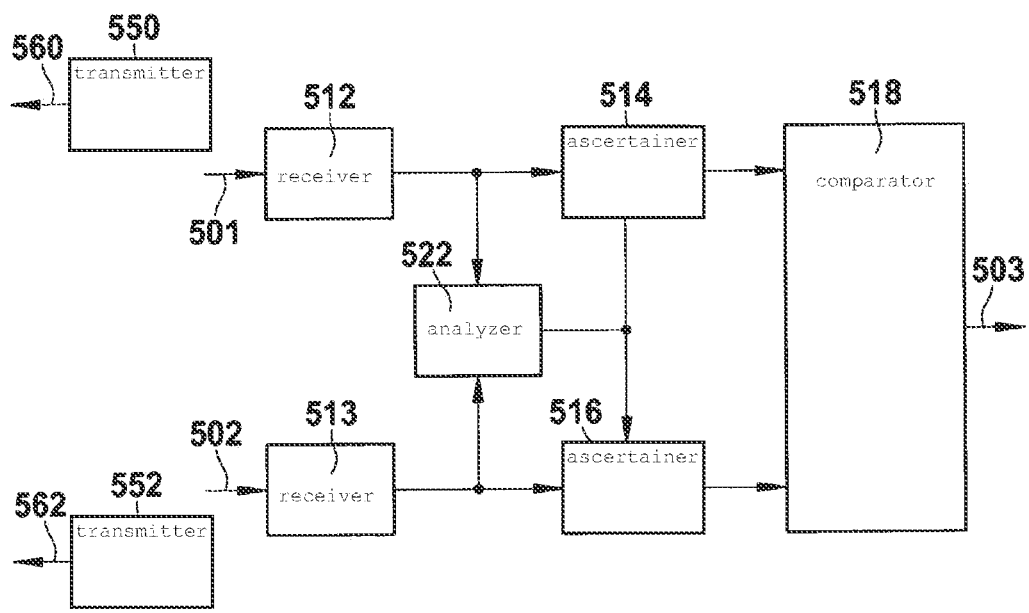
FIG. 5 shows a block diagram of one preferred specific embodiment of the device according to the present invention.

FIG. 5 shows a device for detecting precipitation in a region monitored by radar beams according to one exemplary embodiment of the present invention. The device is designed to receive a first backscattered radar signal 501 and a second backscattered radar signal 502 and to provide a detection and indication signal 503 respectively, which indicate the existence of a homogenously distributed medium such as precipitation. For this, the device has two transmitters 550, 552 for emitting radar radiation and radar signals 560, 562 respectively, and two receivers 512, 513 for receiving backscattered radar signals 501, 502. Receivers 512, 513 are designed to provide the spectra of backscattered radar signals 501, 502 to ascertainers 514, 516. The ascertainers 514, 516 are designed to calculate the average signal powers from the spectra and to provide them to a comparator 518. Comparator 518, in the form of a correlator, for example, is designed to compare the average signal powers to one another. When the signal powers conform, it is assumed that a homogenously distributed medium is in the region monitored by radar beams.

A predefined tolerance range may be used to detect a conformity. The tolerance range may orient itself toward the height of the background noise.

To ascertain the object-free region, the device may have an analyzer 522 that is designed to ascertain the object-free region from the spectra provided by receivers 512, 513 and to provide it to ascertainers 514, 516.

According to the approach according to the present invention, the radar signal is orthogonal to the precipitation. Thus, a Doppler evaluation is not possible, but rather the rain intensity is ascertained via the reflectivity and by integrating the rain backscattering and the rising of the noise floor in the antenna-proximity zone of an FMCW radar system, for example.

Rain is detected in road traffic by correlating the average powers from a plurality of adjacent antenna arrays. The radar system used may be a 76.4 GHz automotive radar system, for example, that is not stationary because it is disposed on a vehicle, for example.

What is claimed is:

1. A method for detecting precipitation in a region monitored by radar beams, the method comprising:
    transmitting at least two radar signals;
    ascertaining a first average power of a first backscattered radar signal;
    ascertaining a second average power of a second backscattered radar signal; and
    detecting an existence of precipitation by comparing the ascertained first average power and the ascertained second average power to each other.

2. The method as recited in claim 1, further comprising:
    ascertaining an additional average power of an additional backscattered radar signal, the first, second and additional backscattered radar signals being generated by reflecting radar signals that are transmitted by adjacently disposed radar antennas or transmitters.

3. The method as recited in claim 1, wherein at least one weighting factor is taken into account when comparing the first average power and the second average power, the at least one weighting factor being designed to compensate for different radar antenna characteristics.

4. The method as recited in claim 1, wherein the first average power and the second average power are respectively ascertained for one object-free section of the monitored region.

5. The method as recited in claim 4, wherein the steps of ascertaining comprise:
    detecting one spectral power density respectively for each backscattered radar signal; and
    integrating the spectral power densities respectively across the object-free section to obtain the average powers.

6. The method as recited in claim 5, wherein the object-free section is determined by analyzing the spectral power densities of the backscattered radar signals, the object-free section corresponding to a shared subsection of the spectral power densities in which none of the spectral power densities has a peak that projects above a background noise of the respective spectral power densities.

7. The method as recited in claim 1, wherein the comparison of the first average power and the second average power includes detecting a conformity of the first average power and the second average power using a correlation.

8. The method as recited in claim 1, further comprising:
    evaluating an increase in the background noise of at least one of the spectral power densities in order to determine a density of precipitation or a radar signal damping.

9. The method as recited in claim 1, wherein the precipitation is rain, hail, or snowfall whose main direction movement is orthogonal to the radar beams.

10. The method as recited in claim 1, wherein a long-range radar FMCW radar transmitter is used to produce radiation cones that partially overlap or that are located next to each other, it being possible to assign the backscattered radar signals to one radiation cone respectively.

11. A device for detecting precipitation in a region monitored by radar beams, the device comprising:
    a transmitting arrangement configured to transmit at least two radar signals;
    an ascertaining arrangement configured to ascertain a first average power of a first backscattered radar signal and to ascertain a second average power of a second backscattered radar signal; and
    a detection arrangement configured to detect an existence of precipitation by comparing the ascertained first average power and the ascertained second average power to each other.

12. A non-transitory computer-readable storage medium storing a computer program, which is executable by a computer, comprising:
    a program code arrangement having program code for performing the following:
        controlling a transmitting arrangement to transmitting at least two radar signals;
        ascertaining a first average power of a first backscattered radar signal;
        ascertaining a second average power of a second backscattered radar signal; and
        detecting an existence of precipitation by comparing the ascertained first average power and the ascertained second average power to each other.

13. A computer program product having a computer program stored on a non-transitory computer-readable storage medium, which is executable by a computer, comprising:
    a program code arrangement having program code for performing the following:
        controlling a transmitting arrangement to transmit at least two radar signals;
        ascertaining a first average power of a first backscattered radar signal;
        ascertaining a second average power of a second backscattered radar signal; and
        detecting an existence of precipitation by comparing the ascertained first average power and the ascertained second average power to each other.

* * * * *

UNITED STATES PATENT AND TRADEMARK OFFICE
CERTIFICATE OF CORRECTION

PATENT NO.       : 8,558,730 B2                       Page 1 of 1
APPLICATION NO.  : 12/093472
DATED            : October 15, 2013
INVENTOR(S)      : Alebel Arage Hassen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this
Fifteenth Day of September, 2015

Michelle K. Lee
*Director of the United States Patent and Trademark Office*